(12) United States Patent
Motomura et al.

(10) Patent No.: US 10,661,569 B2
(45) Date of Patent: May 26, 2020

(54) INK TANK AND INK JET RECORDING APPARATUS

(71) Applicant: CANON KABUSHIKI KAISHA, Tokyo (JP)

(72) Inventors: Maki Motomura, Tokyo (JP); Taro Endo, Kawasaki (JP); Eiichi Nakata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/156,255

(22) Filed: Oct. 10, 2018

(65) Prior Publication Data

US 2019/0111692 A1 Apr. 18, 2019

(30) Foreign Application Priority Data

Oct. 17, 2017 (JP) ................. 2017-200729
Oct. 17, 2017 (JP) ................. 2017-200730
Sep. 26, 2018 (JP) ................. 2018-179946

(51) Int. Cl.
  *B41J 2/175* (2006.01)
  *C09D 11/322* (2014.01)
  *B41J 2/21* (2006.01)

(52) U.S. Cl.
  CPC ....... *B41J 2/17513* (2013.01); *B41J 2/17556* (2013.01); *B41J 2/211* (2013.01); *C09D 11/322* (2013.01); *B41J 2002/17516* (2013.01)

(58) Field of Classification Search
  CPC .... B41J 2002/17516; B41J 2002/17586; B41J 2/17503; B41J 2/17513; B65D 83/0055; B65D 83/0061; B65D 83/0066
  See application file for complete search history.

(56) References Cited

U.S. PATENT DOCUMENTS 4,183,031 A * 1/1980 Kyser ................. B41J 2/17513
                                                101/366
5,903,292 A * 5/1999 Scheffelin ............ B41J 2/17506
                                                347/86

(Continued)

FOREIGN PATENT DOCUMENTS

JP         63118258 A  * 5/1988  .......... B41J 2/17513
JP         2003-226023     8/2003

(Continued)

OTHER PUBLICATIONS

MachineTranslationofJP-63118258-A, Masanori, 1988 (Year: 1988).*

(Continued)

*Primary Examiner* — Scott A Richmond
(74) *Attorney, Agent, or Firm* — Venable LLP

(57) ABSTRACT

An ink tank is used for an ink jet recording apparatus and includes an ink storage bag storing an ink, and the ink storage bag has no mechanism for allowing a side wall portion to shrink into a preliminary defined shape but has a side wall portion to shrink as the ink flows out. The ink tank has no mechanism for adjusting the pressure in the ink storage bag, the ink storage bag is made from a resin, the ink is an aqueous ink containing a coloring material and a water-soluble organic solvent, and the difference between the average SP of the water-soluble organic solvent and the SP of the resin constituting the ink storage bag is 2.0 $(cal/cm^3)^{1/2}$ or more. An ink jet recording apparatus includes the ink tank and a recording head that ejects an ink supplied from the ink tank by an ink jet method.

20 Claims, 7 Drawing Sheets

(56) References Cited

U.S. PATENT DOCUMENTS

| | | | |
|---|---|---|---|
| 2006/0038865 A1* | 2/2006 | Nagasaki | B41J 2/17513 347/86 |
| 2010/0225716 A1* | 9/2010 | Hayakawa | B41J 2/17509 347/86 |
| 2013/0335481 A1* | 12/2013 | Jo | B41J 2/17503 347/36 |
| 2016/0221349 A1* | 8/2016 | Aoki | B41J 2/17513 |
| 2018/0170061 A1* | 6/2018 | Nakamura | B41J 2/16552 |
| 2018/0327130 A1* | 11/2018 | Taruno | B65D 23/02 |

FOREIGN PATENT DOCUMENTS

| | | |
|---|---|---|
| JP | 2009-226809 | 10/2009 |
| JP | 2016-243425 | * 12/2016 |

OTHER PUBLICATIONS

Polymerproperties database (2015) (http://polymerdatabase.com/polymer%20physics/delta%20Table.html) (Year: 2005).*

U.S. Appl. No. 16/155,992, Eiichi Nakata, filed Oct. 10, 2018.

* cited by examiner

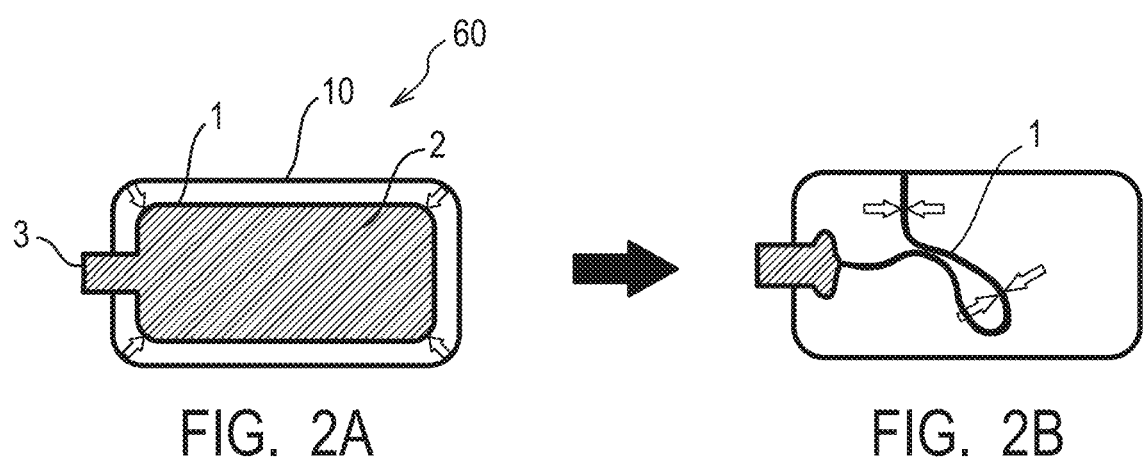

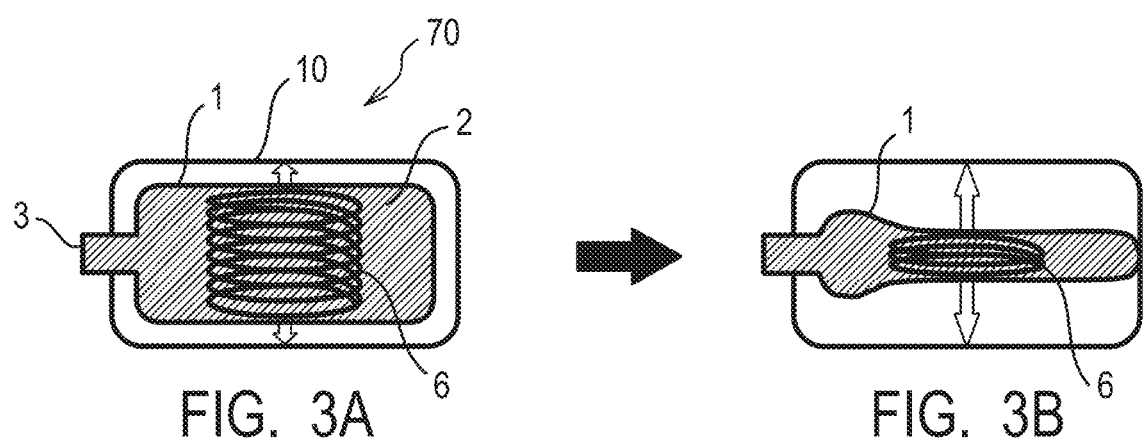

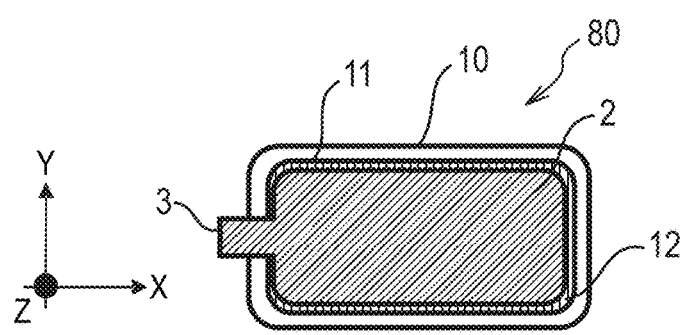
FIG. 4A1
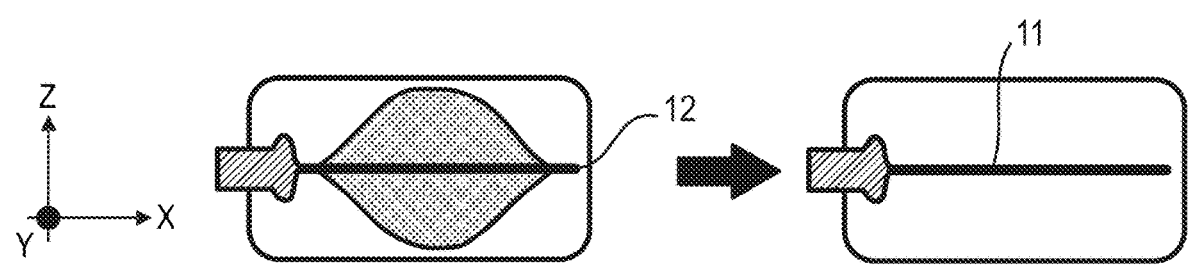
FIG. 4A2    FIG. 4B

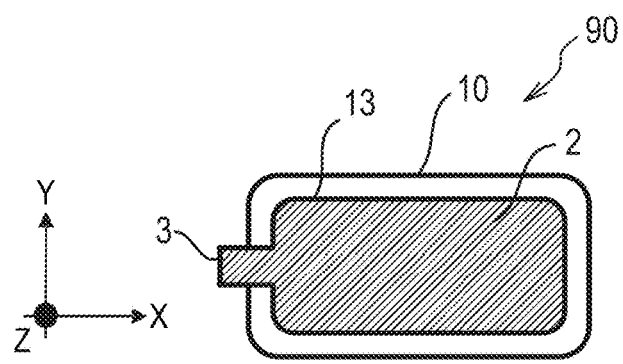
FIG. 5A1
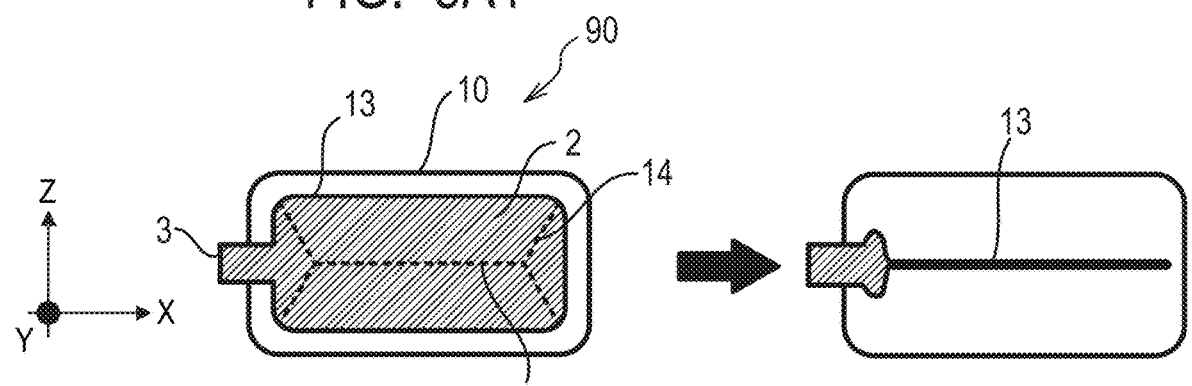
FIG. 5A2  FIG. 5B

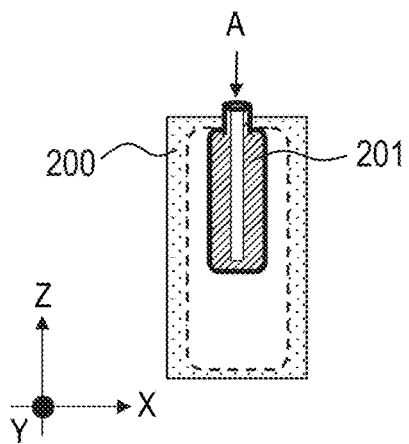
FIG. 6A1
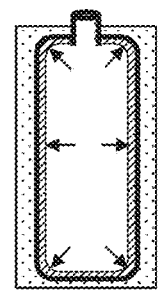
FIG. 6B1
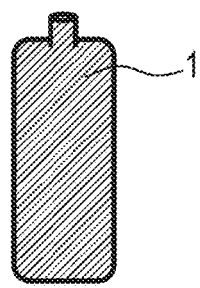
FIG. 6C1
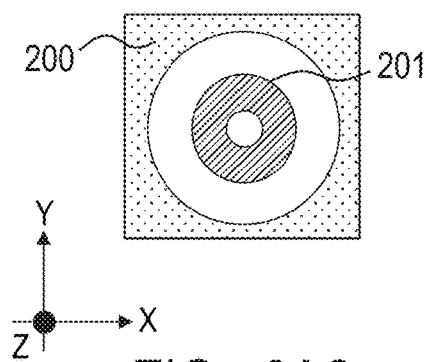
FIG. 6A2
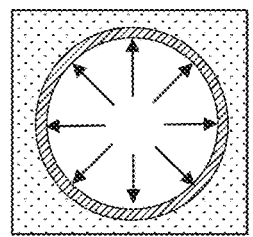
FIG. 6B2
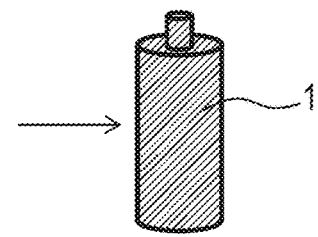
FIG. 6C2
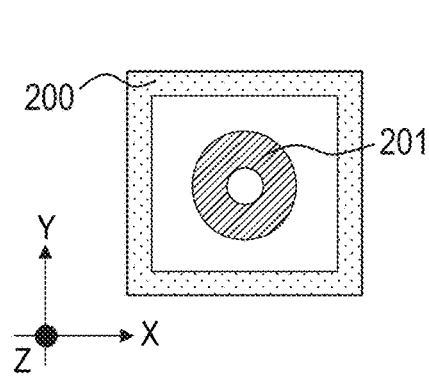
FIG. 6A3
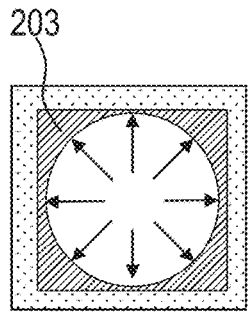
FIG. 6B3
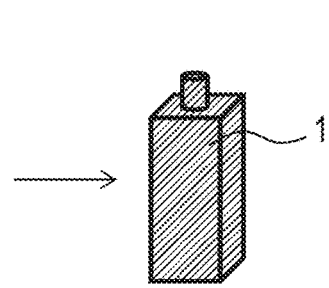
FIG. 6C3

INK TANK AND INK JET RECORDING APPARATUS

BACKGROUND OF THE INVENTION

Field of the Invention

The present invention relates to an ink tank and an ink jet recording apparatus.

Description of the Related Art

Ink tanks used in inkjet recording apparatuses include an ink tank having an ink storage bag made from a resin, which can store a large amount of an ink. The ink tank having an ink storage bag has such a problem as ink use-up property. When an ink is supplied through an ink supply port of an ink tank to a recording head of an ink jet recording apparatus, an ink storage bag shrinks as the ink is supplied (flows out), and the bag collapses irregularly. The force allowing an ink storage bag to shrink and collapse is commonly only a force allowing an ink to flow out.

When an ink jet recording apparatus is used to record images, such an amount of an ink as to be used for recording is supplied from an ink storage bag to a recording head. Even when a large number of images are recorded at once, the amount of an ink supplied to a recording head is still small as compared with the total amount of the ink that can be stored in the ink storage bag, and thus the force allowing the ink to flow out from the ink storage bag is extremely small. The ink storage bag containing a smaller amount of the ink shrinks and collapses and is partially obstructed. Hence, an extremely small force allowing an ink to flow out is insufficient to discharge the ink in the ink storage bag, and it is difficult to use up the ink. This causes problems including low ink use-up property.

To solve such a problem, for example, an ink storage bag having an external pressure applying mechanism such as a spring and an elastic member to push out an ink has been disclosed (Japanese Patent Application Laid-Open No. 2003-226023). This ink storage bag is prepared by bonding margins of two films and is processed in such a way as to collapse in a direction parallel with the bonding face. Another ink storage bag that is controlled to collapse in a particular direction has been disclosed (Japanese Patent Application Laid-Open No. 2009-226809). This ink storage bag has creases that help the bag collapse in a particular direction.

However, providing a mechanism for adjusting the pressure in an ink storage bag or forming a shape for controlling a collapsing or creasing manner of an ink storage bag may have disadvantages in production efficiency, an installation space, a complicated structure and costs. For example, if the mechanism for adjusting the pressure in an ink storage bag is not provided, the ink tank has a simple structure. If the creasing process or the bonding process is not performed but an ink storage bag is produced by blow molding or the like, such an ink storage bag has advantages in production efficiency and costs. However, when the mechanism for adjusting the pressure in an ink storage bag is not provided or the mechanism for controlling the shrinkage of an ink storage bag is not provided, the ink storage bag irregularly collapses as an ink flows out, as mentioned above, and this makes it difficult to completely use up an ink. In addition, ink jet recording apparatuses are intended to be used in various regions, thus are required to be stably operable in a wide range of temperatures, and are preferably designed to be usable at extreme temperatures. Hence, to design an ink jet recording apparatus, various performances are evaluated while the temperature is changed. Studies by the inventors of the present invention have revealed that the ink use-up property may further deteriorate depending on the temperature environment of an ink tank.

An object of the present invention is to provide an ink tank having a simple structure but having excellent ink use-up property. Another object of the present invention is to provide an ink jet recording apparatus including the ink tank.

SUMMARY OF THE INVENTION

In other words, an ink tank according to the present invention is used for an inkjet recording apparatus and includes an ink storage bag storing an ink therein, and the ink storage bag has no mechanism for allowing a side wall portion to shrink into a preliminary defined shape but has a side wall portion to shrink as the ink flows out. The ink tank has no mechanism for adjusting a pressure in the ink storage bag, the ink storage bag is made from a resin, the ink is an aqueous ink containing a coloring material and a water-soluble organic solvent, and a difference between an average SP of the water-soluble organic solvent and an SP of the resin constituting the ink storage bag is 2.0 $(cal/cm^3)^{1/2}$ or more.

An ink tank according to the present invention has a simple structure but has excellent ink use-up property. An ink jet recording apparatus according to the present invention includes the ink tank.

Further features of the present invention will become apparent from the following description of exemplary embodiments with reference to the attached drawings.

BRIEF DESCRIPTION OF THE DRAWINGS

FIGS. 2A and 2B are schematic views showing an example of the ink tank.

FIGS. 3A and 3B are schematic views showing another example of the ink tank.

FIGS. 4A1, 4A2 and 4B are schematic views showing another example of the ink tank.

FIGS. 5A1, 5A2 and 5B are schematic views showing another example of the ink tank.

FIGS. 6A1, 6A2, 6A3, 6B1, 6B2, 6B3, 6C1, 6C2 and 6C3 are schematic views showing production processes of ink storage bags by blow molding.

DESCRIPTION OF THE EMBODIMENTS

Figure 1A:
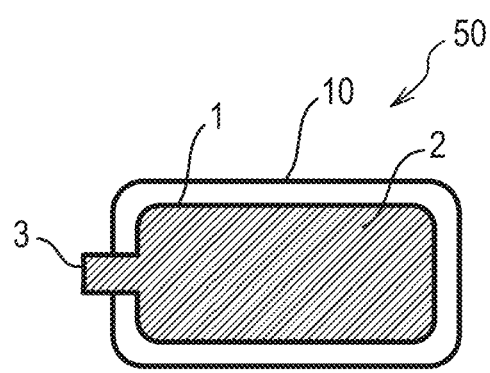
FIGS. 1A, 1B and 1C are schematic views showing an embodiment of an ink tank of the present invention.

Preferred embodiments of the present invention will now be described in detail in accordance with the accompanying drawings.

The present invention will now be described in detail with reference to preferred embodiments. In the present invention, when a compound is a salt, the salt dissociates into ions in an ink, but such a case is expressed as "containing a salt" for convenience. An aqueous ink for inkjet may be simply called "ink". Physical property values are determined at normal temperature (25° C.) at normal pressure (1 atm) unless otherwise noted.

The inventors of the present invention filled, with an ink, an ink storage bag of an ink tank that has an ink storage bag made from a resin and has no mechanism for adjusting the pressure therein. While usage environments and transportation environments of ink jet recording apparatuses are supposed, such ink tanks were stored in various temperature environments and were subjected to various tests. As a result, when an ink that had been frozen and then melted was used while an environment including a cold climate area was supposed, it was ascertained that partial obstruction was likely to be caused in the ink storage bag, and the ink was unlikely to be completely used up.

When an aqueous ink is allowed to stand in an environment at 0° C. or less, the ink may freeze. At this freezing, intermolecular hydrogen bonds are formed, and thus an ink freezes while components except water, such as a water-soluble organic solvent, are extruded from water crystals. As a result, the water-soluble organic solvent is concentrated in a non-frozen portion. When the ink melts from such a state, the concentrated water-soluble organic solvent is not immediately mixed with water, and a portion containing the water-soluble organic solvent at a high concentration comes into contact with an ink storage bag. A part of the ink storage bag having come into contact with the concentrated water-soluble organic solvent swells and softens. Consequently, when the ink storage bag shrinks as the ink flows out (is supplied), softened parts on the inner face of the ink storage bag are likely to adhere to cause partial obstruction, and thus the ink use-up property is supposed to deteriorate.

Specifically, the ink use-up property of an ink tank storing an ink containing a coloring material is more likely to deteriorate. In a melting process of an ink having frozen, water having a comparatively high dielectric constant of the liquid components in an aqueous ink still freezes, and a water-soluble organic solvent having a lower dielectric constant than that of water is concentrated. Accordingly, as compared with before freezing, the liquid component in an ink after freezing and melting has a markedly lower dielectric constant. On this account, a pigment near the concentrated water-soluble organic solvent aggregates due to a reduction in electrostatic repulsion, and thus the ink viscosity increases. A dye near the concentrated water-soluble organic solvent aggregates due to a reduction in solubility, and thus the ink viscosity increases. It is thus supposed that the ink becomes difficult to flow out of an ink storage bag and the ink use-up property further deteriorates.

Typically, SPs are used as the index of compatibility of a two-component solution, and components having a smaller difference in SP have larger solubilities in the respective components. Studies by the inventors of the present invention have revealed that by setting the difference between the average SP of a water-soluble organic solvent and the SP of a resin constituting an ink storage bag at 2.0 $(cal/cm^3)^{1/2}$ or more, the ink storage bag can be prevented from swelling even after freezing and melting of an ink. The reason for this will be described below. In a condition in which the above relation is satisfied, even when a water-soluble organic solvent concentrated in a melting process of an ink having frozen comes into contact with a resin constituting an ink storage bag, the difference between the SP of the resin and the average SP of the water-soluble organic solvent is large, and thus the compatibility between the resin and the water-soluble organic solvent is unlikely to increase. Hence, the ink storage bag is supposed to be prevented from swelling, thus improving the ink use-up property. In a condition in which the concentrated water-soluble organic solvent causes the ink storage bag to swell, a large part of water freezes. Hence, most of the liquid component in contact with the inner face of the ink storage bag is the water-soluble organic solvent. Accordingly, water has a little effect, and the SP of water is not needed to be considered.

<Ink Tank>

An ink tank of the present invention includes an ink storage bag storing an ink therein and is used in an ink jet recording apparatus. The ink storage bag has no mechanism for allowing a side wall portion to shrink into a preliminary defined shape, such as creasing processing. The ink tank of the present invention has no mechanism for adjusting the pressure in the ink storage bag. In other words, the ink storage bag included in the ink tank of the present invention is a bag-shaped member having a side wall portion that can irregularly shrink as the ink flows out. The ink storage bag is made from a resin, and the ink is an aqueous ink containing a coloring material and a water-soluble organic solvent. The difference between the average SP of the water-soluble organic solvent and the SP of the resin constituting the ink storage bag is 2.0 $(cal/cm^3)^{1/2}$ or more. The ink tank of the present invention will now be described in detail.

(Ink Storage Bag)

Figure 1B:
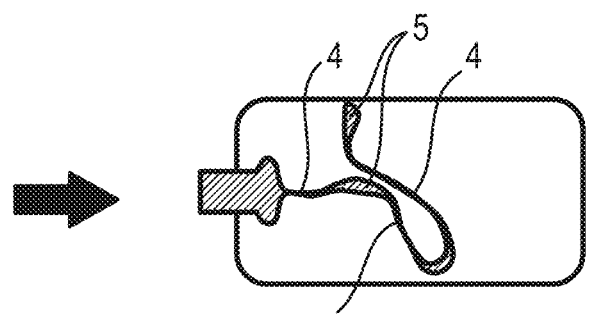
Figure 1C:
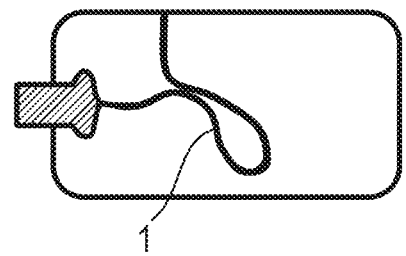

FIGS. 1A to 1C are schematic views showing an embodiment of the ink tank of the present invention. An ink tank 50 in the embodiment shown in FIG. 1A includes a housing 10 and an ink storage bag 1 that is placed in the housing 10 and stores an ink 2. The ink 2 stored in the ink storage bag 1 flows out of the ink 2 through an ink supply port 3 and is supplied to a recording head of an ink jet recording apparatus communicating with the ink supply port 3. The ink tank 50 in the embodiment has no mechanism for adjusting the pressure in the ink storage bag 1. The ink storage bag 1 included in the ink tank 50 has no mechanism for allowing a side wall portion to shrink into a preliminary defined shape. Hence, when the ink 2 in the ink storage bag 1 flows out through the ink supply port 3, the side wall portion of the ink storage bag 1 shrinks and irregularly collapses as the ink 2 flows out, as shown in FIG. 1B and FIG. 1C. The side wall portion of the ink storage bag 1 means a "side portion" where the ink supply port 3 faces upward in the gravity direction. When the side wall portion of the ink storage bag 1 shrinks and irregularly collapses, inner faces facing each other on the side wall portion of the ink storage bag 1 come closer. However, the ink 2 contains a water-soluble organic solvent satisfying a particular relation, and thus the inner faces coming closer of the ink storage bag 1 are prevented from adhering. Accordingly, the ink 2 in the ink storage bag 1 can be used up without waste (FIG. 1C). Even when obstructed portions 4 are partially formed in the ink storage bag 1, the amount of a remaining ink 5 can be as small as possible (FIG. 1B), and the ink use-up property can be improved. As described above, the present invention is intended to suppress the reduction of the use-up property by adhesion of inner faces, and thus the "base part" that does not cause such a problem as use-up property reduction by adhesion is not included in the "side wall portion".

Meanwhile, the case of an ink tank 60 having a mechanism for adjusting the pressure in an ink storage bag will be supposed. As shown in FIG. 2A, a pressure (positive pressure) is applied to an ink storage bag 1 in such a direction that a side wall portion of the ink storage bag 1 shrinks. In the case of the ink tank 60, even when the remaining amount of an ink 2 becomes small, the side wall portion of the ink storage bag 1 shrinks and collapses (FIG. 2B). Hence, the ink 2 can be used up. The case of an ink tank 70 having, in an ink storage bag 1, a spring 6 that is a mechanism for adjusting the pressure in an ink storage bag will be supposed. As shown in FIG. 3A, a pressure (negative pressure) is applied to the ink storage bag 1 in such a direction that the ink storage bag 1 expands. In the case of the ink tank 70, a negative pressure applied with the spring 6 prevents obstruction, and thus no obstructed portion is formed in the ink storage bag 1. Hence, the ink can be used up without waste as shown in FIG. 3B.

The case of an ink tank 80 including an ink storage bag 11 having a connector 12 that is a mechanism for allowing a side wall portion to shrink into a preliminary defined shape as shown in FIGS. 4A1, 4A2 and 4B will be supposed. FIG. 4A1 is a front view of the face with the connector 12 and FIG. 4A2 is a side view of the face with the connector 12. In the case of the ink tank 80, when an ink 2 flows out of the ink storage bag 11, the side wall portion of the ink storage bag 11 shrinks into a preliminary defined shape (FIG. 4B). Hence, the ink can be used up without waste.

The case of an ink tank 90 including an ink storage bag 13 having creases 14 that are a mechanism for allowing a side wall portion to shrink into a preliminary defined shape as shown in FIGS. 5A1, 5A2 and 5B will be supposed. FIGS. 5A1 and 5A2 are views viewed in the same directions as in FIGS. 4A1 and 4A2. In the case of the ink tank 90, when an ink 2 flows out of the ink storage bag 13, the ink storage bag 13 deforms along the creases 14, and the side wall portion shrinks into a preliminary defined shape (FIG. 5B). Hence, the ink can be used up without waste.

The ink storage bag included in the ink tank of the present invention is made from a resin as a material that easily shrinks as the ink flows out and can sufficiently prevent the ink leakage. Specific examples of the resin include thermoplastic resins such as polyolefins (including polyethylene and polypropylene) and polystyrenes; and mixtures and modified products of such thermoplastic resins. Of them, a polyolefin and a mixture containing a polyolefin are preferably used. Specifically, a polyethylene resin is preferably used. A composition of the resin constituting the ink storage bag may contain a glass filler, a pigment filler, a mineral filler or a similar filler.

The difference between the average SP of the water-soluble organic solvent in the ink and the SP of the resin constituting the ink storage bag is 2.0 $(cal/cm^3)^{1/2}$ or more and preferably 4.5 $(cal/cm^3)^{1/2}$ or more. The difference in SP is preferably 10.0 $(cal/cm^3)^{1/2}$ or less. The SP of the resin constituting the ink storage bag is preferably 5.0 $(cal/cm^3)^{1/2}$ or more to 10.0 $(cal/cm^3)^{1/2}$ or less. For example, polyethylene has an SP of 8.6 $(cal/cm^3)^{1/2}$, and polypropylene has an SP of 8.0 $(cal/cm^3)^{1/2}$.

The SP ($\delta$) in the present invention is calculated by Fedors method in accordance with Expression (1). $\Delta E_{vap}$ and V of a resin can be determined with reference to the description in Coating Jiho, No. 193 (1992), for example.

$$\delta = \sqrt{\frac{\Delta E_{vap}}{V}} \quad (1)$$

(In Expression (1), $\Delta E_{vap}$ is the molar heat of vaporization (cal/mol) of a compound, and V is the molar volume (cc/mol) of a compound at 25° C.)

Properties of the resin constituting the ink storage bag can be determined by the following methods. An ink storage bag is cut out into an appropriate size as a measurement sample, and the sample is analyzed by pyrolysis gas chromatography/mass analysis (Py-GC/MS). This analysis reveals the unit type of the resin constituting the ink storage bag. From the determined unit type and chemical shifts of nuclear magnetic resonance (NMR), the composition ratio of units can be determined. From the determined resin units and the composition ratio thereof, the SP of the resin can be determined by Fedors method.

The ink storage bag included in the ink tank of the present invention preferably has an elastic modulus of 500 $N/mm^2$ or less. An ink storage bag having an elastic modulus of 500 $N/mm^2$ or less is fairly soft as compared with that used in a typical ink tank for ink jet. When the ink in an ink tank is used, a side wall portion of a soft ink storage bag spontaneously shrinks without a mechanism for allowing the ink storage bag to shrink, and the ink can be allowed to flow out. The ink storage bag preferably has an elastic modulus of 50 $N/mm^2$ or more. To satisfy such an elastic modulus as above, an ink storage bag made from a single layer of a resin is preferably used.

The elastic modulus of an ink storage bag is determined in accordance with JIS-K-7127 or JIS-K-7161. The measurement is performed by using a tension tester in the following conditions: test mode: tension; displacement speed: 5 mm/min (a sample is displaced until the yield point is observed); sample dimensions: 150 mm in length, 25 mm in width and 1 mm or less in thickness; and chuck distance: 100 mm. The measurement is performed in such conditions, and the elastic modulus is determined from the X-Y gradient in a region in which the X-Y relation is linear, where X is test force and Y is sample displacement, or in the region before the yield point is observed.

For conventional ink tanks, an ink storage bag having a multilayer structure including a plurality of bonded films or an ink storage bag including a resin film on which a metal such as aluminum is deposited has been used in consideration of barrier property. Such an ink storage bag has an elastic modulus much larger than 500 $N/mm^2$ and have satisfactory barrier property but is not soft. To allow an ink to flow out of such a bag, any measures are needed. The ink tanks that are disclosed in Japanese Patent Application Laid-Open No. 2003-226023 and Japanese Patent Application Laid-Open No. 2009-226809 and may be made from a hard material therefore include an ink storage bag processed to have creases, bonded margins or the like or include a mechanism for adjusting the inner pressure in order to allow an ink to smoothly flow out.

The ink storage bag preferably has a cylindrical shape. The inventors of the present invention have studied the ink use-up property of a cylindrical-shaped ink storage bag and a prismatic-shaped ink storage bag and have found that the cylindrical-shaped ink storage bag gives better results. The cylindrical-shaped ink storage bag is likely to have a side wall portion with a uniform thickness at the time of molding, and thus the ink storage bag is likely to collapse isotropically as an ink flows out. In contrast, the prismatic-shaped ink storage bag is unlikely to have a side wall portion with a uniform thickness at the time of molding as compared with the cylindrical-shaped ink storage bag, and accordingly, the prismatic-shaped ink storage bag is likely to collapse non-uniformly as an ink flows out. The ink is thus likely to stay in an obstructed space, and the ink use-up property may deteriorate.

The ink capacity of the ink storage bag can be appropriately set depending on the size of an ink jet recording apparatus, replacement frequency after use-up or the like. Specifically, the ink capacity of the ink storage bag is preferably 100 mL or more to 1,000 mL or less and more preferably 200 mL or more to 800 mL or less. The size of the ink storage bag can be appropriately set depending on the size of an ink jet recording apparatus, ink capacity or the like. Specifically, the bag portion except the ink supply port preferably has a base area of 10 to 100 cm$^2$ and a height of 10 to 30 cm.

The ink storage bag is preferably produced by blow molding or the like from the viewpoint of production efficiency and costs. FIGS. 6A1 to 6C3 are schematic views showing production processes of ink storage bags by blow molding. FIGS. 6A1, 6B1 and 6C1 are schematic views of an ink storage bag 1 viewed from the side wall direction. First, a melted resin as the raw material of an ink storage bag is extruded in a mold 200 to form a pipe-shaped parison 201 (FIG. 6A1). Next, into the parison 201, gas is supplied in the direction of arrow A, and the blown parison 201 is allowed to push in arrow directions or against the inner wall of the mold 200 (FIG. 6B1). The parison 201 is cooled to give a hollow ink storage bag 1 having a shape reproducing the inner shape of the mold 200 (FIG. 6C1).

FIGS. 6A2, 6B2 and 6C2 are schematic sectional views of an ink storage bag 1 when a cylindrical-shaped ink storage bag 1 is produced, and correspond to FIGS. 6A1, 6B1 and 6C1, respectively. Similar as FIGS. 6A1, 6B1 and 6C1, first, a melted resin is extruded in a mold 200 to form a parison 201 (FIG. 6A2). Next, gas is supplied into the parison 201 and the blown parison 201 is allowed to push in arrow directions or against the inner wall of the mold 200 (FIG. 6B2). The parison 201 is cooled to give a hollow ink storage bag 1 having a cylindrical-shape reproducing the inner shape of the mold 200 (FIG. 6C2).

FIGS. 6A3, 6B3 and 6C3 are schematic sectional views of an ink storage bag 1 when a prismatic-shaped ink storage bag 1 is produced, and correspond to FIGS. 6A1, 6B1 and 6C1, respectively. Similar as FIGS. 6A1, 6B1 and 6C1, first, a melted resin is extruded in a mold 200 to form a parison 201 (FIG. 6A3). Next, gas is supplied into the parison 201 and the blown parison 201 is allowed to push in arrow directions or against the inner wall of the mold 200 (FIG. 6B3). The parison 201 is cooled to give a hollow ink storage bag 1 having a prismatic-shape reproducing the inner shape of the mold 200 (FIG. 6C3). As described above, a cylindrical-shaped ink storage bag is preferably used in the present invention. This is because a prismatic-shaped ink storage bag 1 has, on the side wall, such thicker portions than the other portions as corner portions 203 in FIG. 6B3 and thus is unlikely to have a side wall portion with a uniform thickness.

The ink storage bag is stored in a housing having an appropriate rigidity, for example. Examples of the material of the housing include thermoplastic resins such as polyesters, polycarbonates, polyolefins (including polyethylene and polypropylene) and polyphenylene ethers; and mixtures and modified products of such thermoplastic resins. The housing preferably has a similar shape to the shape of the ink storage bag. The housing preferably has an air communicating port in order to take air from the outside as the ink storage bag in the housing shrinks and to maintain the pressure in the housing equivalent to the atmospheric pressure.

(Ink)

The ink stored in the ink storage bag in the ink tank of the present invention is an aqueous ink for ink jet containing a coloring material and a water-soluble organic solvent. The difference between the average SP of the water-soluble organic solvent and the SP of the resin constituting the ink storage bag is 2.0 (cal/cm$^3$)$^{1/2}$ or more. The ink used in the recording method of the present invention is not necessarily what is called a "curable ink". Hence, the ink used in the present invention does not necessarily contain such a compound as a polymerizable monomer that is polymerizable by application of external energy. Components constituting the ink and physical properties of the ink will next be described in detail.

[Coloring Material]

As the coloring material, a pigment or a dye can be used. Specifically, a pigment is preferably used. The content (% by mass) of the coloring material in the ink is preferably 0.50% by mass or more to 15.00% by mass or less and more preferably 1.00% by mass or more to 10.00% by mass or less based on the total mass of the ink.

Specific examples of the pigment include inorganic pigments such as carbon black and titanium oxide; and organic pigments such as azo pigments, phthalocyanine pigments, quinacridone pigments, isoindolinone pigments, imidazolone pigments, diketopyrrolopyrrole pigments and dioxazine pigments.

In terms of the dispersion manner of a pigment, a resin-dispersed pigment containing a resin as a dispersant or a self-dispersible pigment in which the particle surface of a pigment is bonded to a hydrophilic group can be included. In addition, a resin-bonded pigment in which the particle surface of a pigment is chemically bonded to an organic group containing a resin or a microcapsule pigment in which the particle surface of a pigment is covered with or encapsulated in a resin or the like can also be used, for example. When a pigment is used as the coloring material, a self-dispersible pigment or a resin-dispersed pigment dispersed by a resin dispersant that is physically adsorbed onto the particle surface of a pigment (i.e., a resin-dispersed pigment except resin-bonded pigments and microcapsule pigments) is preferred.

As the resin dispersant for dispersing a pigment in an aqueous medium, a dispersant having an anionic group that enables a pigment to be dispersed in an aqueous medium is preferably used. As the resin dispersant, such resins as described later, specifically water-soluble resins can be used. In the ink, the mass ratio of the content (% by mass) of the pigment relative to the content (% by mass) of the resin dispersant is preferably 0.3 times or more to 10.0 times or less.

As the self-dispersible pigment, a pigment in which an anionic group such as a carboxylic acid group, a sulfonic acid group and a phosphonic acid group is bonded directly or through an additional atomic group (—R—) to the particle surface of the pigment can be used. The anionic group may be either an acid form or a salt form. An anionic group in a salt form may dissociate partly or completely. Examples of the cation as the counter ion of an anionic group in a salt form include alkali metal cations, ammonium and organic ammoniums. Specific example of the additional atomic group (—R—) include linear or branched alkylene groups having 1 to 12 carbon atoms; arylene groups such as a phenylene group and a naphthylene group; a carbonyl group; an imino group; an amido group; a sulphonyl group; an ester group; and an ether group. The additional atomic group may be a combination group of them.

As the dye, a dye having an anionic group is preferably used. Specific examples of the dye include azo dyes, triphenylmethane dyes, (aza)phthalocyanine dyes, xanthene dyes and anthrapyridone dyes.

[Water-Soluble Organic Solvent]

The ink is an aqueous ink containing a water-soluble organic solvent. The difference between the average SP of the water-soluble organic solvent and the SP of the resin constituting the ink storage bag is 2.0 $(cal/cm^3)^{1/2}$ or more. As the water-soluble organic solvent, any solvent usable in ink jet inks, such as alcohols, (poly)alkylene glycols, glycol ethers, nitrogen-containing compounds and sulfur-containing compounds, can be used. The content (% by mass) of the water-soluble organic solvent in the aqueous ink is preferably 3.00% by mass or more to 50.00% by mass or less and more preferably 10.00% by mass or more to 50.00% by mass or less based on the total mass of the ink. Although the "water-soluble organic solvent" typically means a liquid, a solvent that is solid at 25° C. (normal temperature) is also included in the water-soluble organic solvent in the present invention for convenience. Specific examples of the water-soluble organic solvent solid at 25° C. generally used in aqueous inks will be described later.

By maintaining a stable state of a coloring material in a melting process of an ink having frozen, the ink use-up property can be further improved. In order to maintain a stable state of a coloring material in a melting process of an ink, a water-soluble organic solvent is preferably contained at a certain ratio to a coloring material while the above SP relation is satisfied. Hence, in the ink, the mass ratio of the content (% by mass) of the water-soluble organic solvent relative to the content (% by mass) of the coloring material is preferably 1.0 time or more. When the mass ratio is 1.0 time or more, components extruded from water crystals in a freezing process of an ink include a water-soluble organic solvent, which has a larger molecular size than that of water, in a considerable amount relative to a coloring material, thus the coloring material is prevented from aggregating due to solvation, and the reduction of the ink use-up property is likely to be suppressed. The mass ratio is preferably 200.0 times or less, more preferably 20.0 times or less and particularly preferably 10.0 times or less. When the mass ratio is 200.0 times or less, the water-soluble organic solvent is not excessively contained relative to the coloring material, thus excess aggregation of the coloring material is suppressed, and the reduction of the ink use-up property is likely to be suppressed.

[SP]

Atypical aqueous ink for inkjet contains a plurality of water-soluble organic solvents. Hence, the SP of the water-soluble organic solvent in the ink used in the ink tank of the present invention is preferably expressed as "average SP". The average SP is determined as follows: the intrinsic SP of a water-soluble organic solvent is multiplied by the proportion (% by mass) of the water-soluble organic solvent in the total amount of water-soluble organic solvents in an ink; and the total sum of the values of the respective water-soluble organic solvents is calculated. When an ink contains a single water-soluble organic solvent, the SP of the water-soluble organic solvent is the "average SP".

For example, in the case of "ink 1" prepared in the following "examples", the composition of water-soluble organic solvents (a total amount of 25.0 parts by mass) is as shown below. A value in parentheses is the SP of a water-soluble organic solvent (units are not indicated).

Glycerol (16.4): 11.0 parts by mass
Triethylene glycol (13.6): 5.0 parts by mass
2-Pyrrolidone (12.6): 5.0 parts by mass
1,2-Hexanediol (11.8): 2.0 parts by mass
Polyethylene glycol having a number-average molecular weight of 1,000 (10.1): 2.0 parts by mass The average SP of the water-soluble organic solvents in the "ink 1" can be calculated as follows:

$$Average\ SP = 16.4 \times 11.0/25.0 + 13.6 \times 5.0/25.0 + 12.6 \times 5.0/25.0 + 11.8 \times 2.0/25.0 + 10.1 \times 2.0/25.0 = 14.2.$$

The average SP of water-soluble organic solvents in the ink is preferably 4.5 $(cal/cm^3)^{1/2}$ or more to 20.0 $(cal/cm^3)^{1/2}$ or less and more preferably 10.5 $(cal/cm^3)^{1/2}$ or more to 16.0 $(cal/cm^3)^{1/2}$ or less. The average SP is particularly preferably 13.0 $(cal/cm^3)^{1/2}$ or more to 16.0 $(cal/cm^3)^{1/2}$ or less.

SPs of water-soluble organic solvents generally used in aqueous inks for ink jet as determined by Fedors method are shown below, where the unit $(cal/cm^3)^{1/2}$ is not indicated: glycerol (16.4), 1,3-propanediol (16.1), trimethylolpropane (15.9), 1,4-butanediol (15.0), diethylene glycol (15.0), ethylene glycol (14.8), 1,3-butanediol (14.8), 2-methyl-1,3-propanediol (14.8), 1,2,6-hexanetriol (14.5), urea (14.4), ethylene urea (14.2), 1,5-pentanediol (14.2), methanol (13.8), triethylene glycol (13.6), 1,6-hexanediol (13.5), 3-methyl-1,5-pentanediol (13.4), tetraethylene glycol (12.8), 2-pyrrolidone (12.6), ethanol (12.6), 1,2-pentanediol (12.2), ethylene glycol monomethyl ether (12.0), n-propanol (11.8), 1,2-hexanediol (11.8), isopropanol (11.6), N-methyl-2-pyrrolidone (11.5), ethylene glycol monoethyl ether (12.0), 1,3-dimethyl-2-imidazolidinone (11.4), n-butanol (11.3), diethylene glycol monomethyl ether (11.2), 2-butanol (11.1), isobutanol (11.1), diethylene glycol monoethyl ether (10.9), tert-butanol (10.9), triethylene glycol monoethyl ether (10.6), polyethylene glycol having a number-average molecular weight of 600 (10.5), diethylene glycol monobutyl ether (10.5), triethylene glycol monobutyl ether (10.3), tetraethylene glycol monobutyl ether (10.2), polyethylene glycol having a number-average molecular weight of 1,000 (10.1), acetone (9.1), methyl ethyl ketone (9.0), tetraethylene glycol dimethyl ether (8.5), triethylene glycol butyl methyl ether (8.4) and ethylene glycol dimethyl ether (7.6). The SP of a water-soluble organic solvent contained in the ink is preferably 5.0 $(cal/cm^3)^{1/2}$ or more to 20.0 $(cal/cm^3)^{1/2}$ or less.

[Dielectric Constant]

As described above, the ink use-up property of an ink tank storing an ink containing a coloring material is likely to deteriorate. When a water-soluble organic solvent is concentrated in a melting process of an ink having frozen, a pigment near the water-soluble organic solvent aggregates due to a reduction in electrostatic repulsion, and the ink viscosity increases. A dye near the concentrated water-soluble organic solvent relatively has low polarity due to the absence of water having high polarity, thus aggregates due to a reduction in solubility, and the ink viscosity increases. This makes it difficult to discharge the ink in an ink storage bag, and the ink use-up property is likely to deteriorate. Hence, in order to suppress the increase of ink viscosity to further improve the ink use-up property in consideration of interaction to a coloring material in the ink, a water-soluble organic solvent having a high dielectric constant is preferably used to maintain the electrostatic repulsion of a pigment or the solubility of a dye. Specifically, the water-soluble organic solvent preferably has an average dielectric constant of 20.0 or more. From a similar reason to the case of the SP, water has a little effect, and thus the effect of water is not needed to be considered also for dielectric constant.

The dielectric constant of a water-soluble organic solvent or water can be determined by using a dielectric constant meter (for example, trade name "BI-870" (manufactured by BROOKHAVEN INSTRUMENTS CORPORATION)) at a frequency of 10 kHz. The dielectric constant of a water-soluble organic solvent that is solid at a temperature of 25° C. can be determined by measuring the dielectric constant of a 50% by mass aqueous solution and calculating the objective dielectric constant in accordance with Expression (A). Although the "water-soluble organic solvent" typically means a liquid, a solvent that is solid at 25° C. (normal temperature) is also included in the water-soluble organic solvent in the present invention.

$$\varepsilon_{sol} = 2\varepsilon_{50\%} - \varepsilon_{water} \qquad (A)$$

$\varepsilon_{sol}$: The dielectric constant of a water-soluble organic solvent solid at 25° C.
$\varepsilon_{50\%}$: The dielectric constant of a 50% by mass aqueous solution of the water-soluble organic solvent solid at 25° C.
$\varepsilon_{water}$: The dielectric constant of water Specific examples of the water-soluble organic solvent solid at 25° C., generally used in an aqueous ink include 1,6-hexanediol, trimethylolpropane, ethylene urea, urea and polyethylene glycol having a number-average molecular weight of 1,000.

The reason why the dielectric constant of a water-soluble organic solvent solid at 25° C. is calculated from the dielectric constant of a 50% by mass aqueous solution will be described. Some of the water-soluble organic solvents that are solid at 25° C. and usable as a component of an aqueous ink are difficult to give an aqueous solution having a high concentration of more than 50% by mass. Meanwhile, the dielectric constant of an aqueous solution having a low concentration of 10% by mass or less is dominated by the dielectric constant of water. It is thus difficult to determine the probable (practical) dielectric constant value of such a water-soluble organic solvent. The inventors of the present invention have studied and found that most of the water-soluble organic solvents that are solid at 25° C. and usable in inks can give a measurable aqueous solution and the calculated dielectric constants match with the advantageous effects of the invention. For the above reason, the dielectric constant of a water-soluble organic solvent solid at 25° C. is intended to be calculated from the dielectric constant of a 50% by mass aqueous solution in the present invention. For a water-soluble organic solvent that is solid at 25° C. but has a low solubility in water and cannot give a 50% by mass aqueous solution, an aqueous solution at saturated concentration is used, and the dielectric constant is calculated in accordance with the above calculation of $\varepsilon_{sol}$ and is used expediently.

The average dielectric constant is determined as follows: the intrinsic dielectric constant of a water-soluble organic solvent is multiplied by the proportion (% by mass) of the water-soluble organic solvent in the total amount of water-soluble organic solvents in an ink; and the total sum of the values of the respective water-soluble organic solvents is calculated. When an ink contains a single water-soluble organic solvent, the dielectric constant of the water-soluble organic solvent is the "average dielectric constant".

For example, in the case of "ink 1" prepared in the following "examples", the composition of water-soluble organic solvents (a total amount of 25.0 parts by mass) is as shown below. A value in parentheses is the dielectric constant of a water-soluble organic solvent.

Glycerol (42.3): 11.0 parts by mass
Triethylene glycol (22.7): 5.0 parts by mass
2-Pyrrolidone (28.0): 5.0 parts by mass
1,2-Hexanediol (14.8): 2.0 parts by mass
Polyethylene glycol having a number-average molecular weight of 1,000 (4.6): 2.0 parts by mass The average dielectric constant of the water-soluble organic solvents in the "ink 1" can be calculated as follows:

Average dielectric constant=42.3×11.0/25.0+22.7× 5.0/25.0+28.0×5.0/25.0+14.8×2.0/25.0+4.6×2.0/ 25.0=30.3.

The average dielectric constant of water-soluble organic solvents in the ink is preferably 20.0 or more to 50.0 or less and more preferably 30.0 or more to 40.0 or less.

Dielectric constants of water-soluble organic solvents generally used in aqueous inks for ink jet are shown below: urea (110.3), ethyl isopropyl sulfone (59.0), ethylene urea (49.7), dimethyl sulfoxide (48.9), glycerol (42.3), γ-butyrolactone (41.9), ethylene glycol (40.4), 1-(2-hydroxyethyl)-2-pyrrolidone (37.6), trimethylolpropane (33.7), methanol (33.1), N-methyl-2-pyrrolidone (32.0), triethanolamine (31.9), diethylene glycol (31.7), 1,4-butanediol (31.1), 1,3-butanediol (30.0), 3-methylsulfolane (29.0), 1,2-propanediol (28.8), 1,2,6-hexanetriol (28.5), 2-methyl-1,3-propanediol (28.3), 2-pyrrolidone (28.0), 1,5-pentanediol (27.0), 3-methyl-1,3-butanediol (24.0), 3-methyl-1,5-pentanediol (23.9), ethanol (23.8), 1-(hydroxymethyl)-5,5-dimethylhydantoin (23.7), triethylene glycol (22.7), tetraethylene glycol (20.8), polyethylene glycol having a number-average molecular weight of 200 (18.9), 2-ethyl-1,3-hexanediol (18.5), isopropanol (18.3), 1,2-hexanediol (14.8), n-propanol (12.0), polyethylene glycol having a number-average molecular weight of 600 (11.4), triethylene glycol monobutyl ether (9.8), tetraethylene glycol monobutyl ether (9.4), tripropylene glycol monomethyl ether (8.5), 1,6-hexanediol (7.1) and polyethylene glycol having a number-average molecular weight of 1,000 (4.6). Each water-soluble organic solvent contained in the ink preferably has a dielectric constant of 3.0 or more to 120.0 or less. A water-soluble organic solvent contained in the ink preferably has a lower vapor pressure at 25° C. than the vapor pressure of water at 25° C.

[Verification Method]

Properties of a water-soluble organic solvent can be determined by the following methods. An appropriate amount of an ink is diluted with methanol, and the resulting sample is subjected to qualitative analysis by gas chromatography/mass analysis (GC/MS) to determine the type of a water-soluble organic solvent. The content of a water-soluble organic solvent can be determined by absolute calibration curve method with standard solutions of a component to be analyzed. The average SP and the average dielectric constant of water-soluble organic solvents in an ink can be determined from the determined types and contents of water-soluble organic solvents.

[Resin]

The ink can contain a resin. The content (% by mass) of the resin in the ink is preferably 0.10% by mass or more to 20.00% by mass or less and more preferably 0.50% by mass or more to 15.00% by mass or less based on the total mass of the ink.

The resin can be added to an ink for (i) stabilizing the dispersion state of a pigment, or as a resin dispersant or an assistant therefor. The resin can also be added to an ink for (ii) improving various properties of an image to be recorded. Examples of the resin, in terms of structure, include a block copolymer, a random copolymer, a graft copolymer and combinations of them. The resin may be a water-soluble resin that can be dissolved in an aqueous medium or a resin particle that is dispersed in an aqueous medium. The resin particle does not necessarily contain a coloring material. The resin particle is preferably self-dispersible or dispersible without any resin dispersant.

In the present specification, the "water-soluble resin" is a resin that does not form a particle having such particle sizes as to be measurable by dynamic light scattering when the resin is neutralized with an equivalent amount of an alkali to the acid value thereof. Whether the resin is water-soluble can be determined by the following procedure. First, a resin is neutralized with an alkali (for example, sodium hydroxide or potassium hydroxide) in an amount corresponding to the acid value thereof to give a liquid containing the resin (resin solid content: 10% by mass). Next, the prepared liquid is diluted 10-fold (in terms of volume) with pure water to give a sample solution. The resin particle size in the sample solution is then measured by dynamic light scattering. When the particle having particle size is not observed, such a resin can be determined to be water-soluble. The conditions for the measurement can be as follows.

[Measurement Conditions]
SetZero: 30 seconds
Number of measurement: 3 times
Measurement time: 180 seconds As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions and the like are not limited to the above.

The water-soluble resin preferably has an acid value of 100 mg KOH/g or more to 250 mg KOH/g or less. The resin constituting the resin particle preferably has an acid value of 5 mg KOH/g or more to 200 mg KOH/g or less. The water-soluble resin preferably has a weight average molecular weight of 3,000 or more to 15,000 or less. The resin constituting the resin particle preferably has a weight-average molecular weight of 1,000 or more to 2,000,000 or less and more preferably 250,000 or more to 550,000 or less. The resin particle preferably has an average particle size (particle size at an accumulation volume of 50% ($D_{50}$)) of 100 nm or more to 500 nm or less as determined by dynamic light scattering method.

Examples of the resin include acrylic resins, urethane resins and olefinic resins. Specifically, acrylic resins and urethane resins are preferred, and acrylic resins are more preferred.

The acrylic resin preferably has a hydrophilic unit and a hydrophobic unit as constitutional units. Specifically preferred is a resin having a hydrophilic unit derived from (meth)acrylic acid and a hydrophobic unit derived from at least one of a monomer having an aromatic ring and a (meth)acrylate monomer. Particularly preferred is a resin having a hydrophilic unit derived from (meth)acrylic acid and a hydrophobic unit derived from at least one monomer of styrene and α-methylstyrene. These resins are likely to interact with a pigment and thus can be preferably used as a resin dispersant for dispersing a pigment.

The hydrophilic unit is a unit having a hydrophilic group such as an anionic group. The hydrophilic unit can be formed by polymerizing a hydrophilic monomer having a hydrophilic group, for example. Specific examples of the hydrophilic monomer having a hydrophilic group include acidic monomers having a carboxylic acid group, such as (meth)acrylic acid, itaconic acid, maleic acid and fumaric acid and anionic monomers such as anhydrides and salts of these acidic monomers. Examples of the cation constituting a salt of an acidic monomer include a lithium ion, a sodium ion, a potassium ion, an ammonium ion and organic ammonium ions. The hydrophobic unit is a unit not having a hydrophilic group such as an anionic group. The hydrophobic unit can be formed by polymerizing a hydrophobic monomer not having a hydrophilic group such as an anionic group, for example. Specific examples of the hydrophobic monomer include monomers having an aromatic ring, such as styrene, α-methylstyrene and benzyl (meth)acrylate; and (meth)acrylate monomers such as methyl (meth)acrylate, butyl (meth)acrylate and 2-ethylhexyl (meth)acrylate.

The urethane resin can be prepared by reacting a polyisocyanate with a polyol, for example. The urethane resin may be prepared by further reacting a chain extender. Examples of the olefinic resin include polyethylene and polypropylene.

[Aqueous Medium]

The ink used in the ink tank of the present invention is an aqueous ink containing at least water as an aqueous medium. The ink contains an aqueous medium as a mixed solvent of water and a water-soluble organic solvent. As the water, deionized water or ion-exchanged water is preferably used. In the aqueous ink, the content (% by mass) of water is preferably 50.00% by mass or more to 95.00% by mass or less based on the total mass of the ink.

[Surfactant]

The ink preferably contains a surfactant. As with the water-soluble organic solvent, a surfactant is also extruded from water crystals in a freezing process, and is aligned while the hydrophobic moiety thereof faces the ink storage bag whereas the hydrophilic moiety faces an aqueous medium contained in the ink. Hence, by adding a surfactant into an ink, obstruction of the ink storage bag is likely to be prevented even when the ink storage bag shrinks as the ink flows out, and the inner faces of the ink storage bag come closer to each other. Consequently, the ink use-up property can be further improved. The content (% by mass) of the surfactant in the ink is preferably 0.05% by mass or more to 10.00% by mass or less based on the total mass of the ink.

Examples of the surfactant include ionic surfactants such as anionic surfactants, cationic surfactants and amphoteric surfactants; and nonionic surfactants. Of them, a nonionic surfactant is preferred. The nonionic surfactant has no charge, thus more strongly interacts with an ink storage bag, which also has no charge, due to van der Waals force, and is likely to be aligned with the ink storage bag. Examples of the surfactant include, in terms of constituent materials, hydrocarbon surfactants, fluorine-containing surfactants and silicone-containing surfactants. Specifically preferred are fluorine-containing surfactants and silicone-containing surfactants. In particular, a fluorine-containing nonionic surfactant or a silicone-containing nonionic surfactant can particularly effectively reduce the surface energy of an ink storage bag with which a surfactant is aligned. A material having a low surface energy is unlikely to adhere to other materials. Hence, by adding, to an ink, a fluorine-containing surfactant or a silicone-containing surfactant, the inner faces of an ink storage bag can be less likely to adhere to each other, and the ink use-up property can be further improved.

[Additional Additive]

The ink may contain, in addition to the above components, various additives such as an antifoaming agent, a pH adjuster, a viscosity modifier, an anticorrosive, an antiseptic agent, an antifungal agent, an antioxidant and a reduction inhibitor, as needed. Typically, such an additive is contained in an ink at a considerably small content, and the "direct" effect on swelling of an ink storage bag is also small. On this account, such an additive is not included in the "water-soluble organic solvent" in the present invention and is eliminated from the calculation of SPs and dielectric constants.

<Ink Jet Recording Apparatus>

An ink jet recording apparatus of the present invention includes the above ink tank and a recording head that ejects an ink supplied from the ink tank by an ink jet method. The ink jet recording apparatus of the present invention will next be described with reference to drawings.

Figure 7:
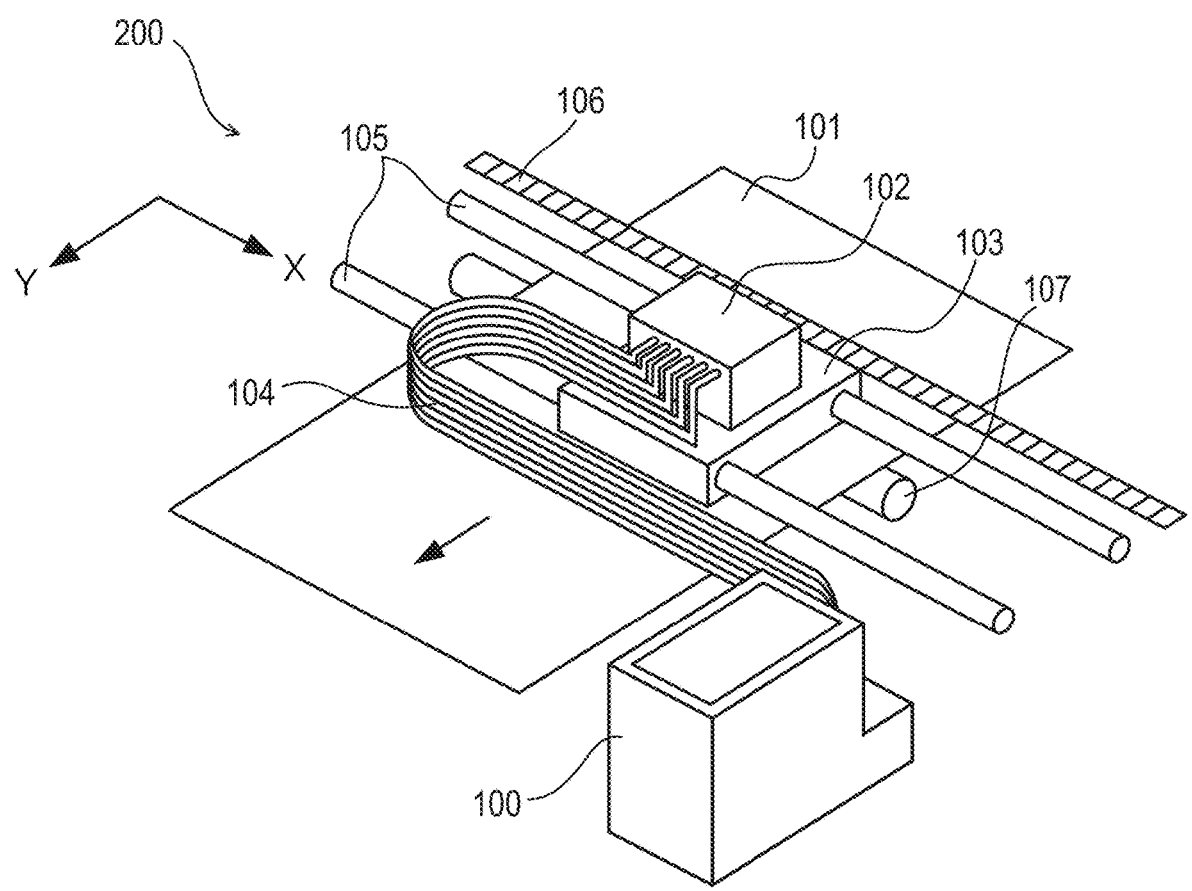
FIG. 7 is a perspective view schematically showing an embodiment of an ink jet recording apparatus of the present invention.

FIG. 7 is a perspective view schematically showing an embodiment of the ink jet recording apparatus of the present invention. An ink jet recording apparatus 200 of the embodiment shown in FIG. 7 is what is called a serial-type ink jet recording apparatus that records images by reciprocating scanning of a recording head in the X direction (main scanning direction). A recording medium 101 is intermittently conveyed in the Y direction (sub scanning direction) by a conveyor roller 107. A carriage 103 is supported in such a way as to be movable along guide rails 105 placed along the X direction and is fixed to an endless belt 106 that moves in parallel with the guide rails 105. The endless belt 106 is reciprocated by the driving force of a motor. The carriage 103 is reciprocated and swept in the X direction by the reciprocation of the endless belt 106.

A recording unit 102 installed on the carriage 103 is also reciprocated and swept in the X direction (main scanning direction). By the conveyance of the recording medium 101 in the Y direction and the reciprocating scanning of the recording unit 102 in the X direction, recording is performed. An ink is supplied from an ink tank 100 through an ink supply tube 104 to the recording unit 102. Subsequently, the ink is ejected from an ejection orifice of a recording head provided on the recording unit 102. The ink jet recording apparatus of the present invention is applicable to various systems including a full-line system and a serial scan system.

EXAMPLES

The present invention will next be described in further detail with reference to examples, comparative examples and reference examples, but the invention is not intended to be limited to the following examples without departing from the scope of the invention. Component amounts with "part" or "%" are based on mass unless otherwise noted.

<Production of Ink Tank Main Body>

An ink storage bag prepared by blow molding (a base area of 20 cm$^2$, a height of 16 cm, a capacity of 320 mL) was placed in a polyethylene housing, giving ink tank main bodies 1 to 10 having structures shown in Table 1. Various physical properties were determined using a sample prepared by cutting out a produced ink storage bag into an appropriate size. The SP of a resin was determined using an analyzed composition by Fedors method. The elastic modulus of an ink storage bag was determined using a strip-shaped sample 150 mm×25 mm in size that was prepared by cutting out the ink storage bag. The measurement was performed by using a tension tester (trade name "Autograph AGS-X", manufactured by Shimadzu Corporation) in the following conditions: test mode, tension; chuck distance, 100 mm; and displacement speed, 5 mm/min.

TABLE 1

Structures of ink tank main body

| Ink tank main body | Schematic design | Pressure regulatory mechanism | Shrinkage control mechanism | Housing material | Ink storage bag Material | Resin SP $(cal/cm^3)^{1/2}$ | Elastic modulus $(N/mm^2)$ | Shape |
|---|---|---|---|---|---|---|---|---|
| 1 | FIGS. 1A to 1C | Without | Without | PE | PE | 8.6 | 100 | Cylindrical |
| 2 | FIGS. 1A to 1C | Without | Without | PE | PP | 8.0 | 100 | Cylindrical |
| 3 | FIGS. 1A to 1C | Without | Without | PE | PE | 8.6 | 100 | Prismatic |
| 4 | FIGS. 1A to 1C | Without | Without | PE | PE | 8.6 | 50 | Cylindrical |
| 5 | FIGS. 1A to 1C | Without | Without | PE | PE | 8.6 | 500 | Cylindrical |
| 6 | FIGS. 1A to 1C | Without | Without | PE | PE | 8.6 | 520 | Cylindrical |
| 7 | FIGS. 2A and 2B | Positive pressure | Without | PE | PE | 8.6 | 100 | Cylindrical |
| 8 | FIGS. 3A and 3B | Negative pressure | Without | PE | PE | 8.6 | 100 | Cylindrical |
| 9 | FIGS. 4A1, 4A2 and 4B | Without | With | PE | PE | 8.6 | 100 | Cylindrical |
| 10 | FIGS. 5A1, 5A2 and 5B | Without | With | PE | PE | 8.6 | 100 | Cylindrical |

PE: polyethylene,
PP: polypropylene

<Preparation of Pigment Dispersion Liquid>

(Pigment Dispersion Liquid 1)

In a batch type vertical sand mill (manufactured by Aimex) containing 200 parts of 0.3-mm zirconia beads, a mixture of 10.0 parts of a pigment, 15.0 parts of an aqueous resin solution and 75.0 parts of pure water was placed and dispersed for 5 hours while cooled with water. The pigment used was trade name "CROMOPHTAL Jet magenta 2BC" (manufactured by Ciba Specialty Chemicals). The aqueous resin solution was prepared as follows: a styrene-ethyl acrylate-acrylic acid copolymer having an acid value of 150 mg KOH/g and a weight-average molecular weight of 8,000 was dissolved in water containing an equivalent molar amount of potassium hydroxide to the acid value thereof to give an aqueous solution having a resin content (solid content) of 20.0%. The resulting liquid was subjected to pressure filtration through a cellulose acetate filter with a pore size of 3.0 Lm (manufactured by ADVANTEC), giving a pigment dispersion liquid 1. The pigment dispersion liquid 1 had a pigment content of 10.0% and a resin content of 3.0%.

(Pigment Dispersion Liquid 2)

As the aqueous resin solution, an aqueous solution of a styrene-N,N-dimethylaminoethyl methacrylate-ethyl acrylate copolymer having a weight-average molecular weight of 20,000 (composition (mass) ratio=50:40:10) (a resin content (solid content) of 20.0%) was used. The same procedure as for the above pigment dispersion liquid 1 was performed except that this aqueous resin solution was used, giving a pigment dispersion liquid 2. The pigment dispersion liquid 2 had a pigment content of 10.0% and a resin content of 3.0%.

<Preparation of Ink>

Components (unit: %) shown in Table 2 were mixed and thoroughly stirred, and each mixture was subjected to pressure filtration through a membrane filter with a pore size of 1.2 Lm (trade name "HDCII Filter", manufactured by Pall), giving an ink. The numerical value with polyethylene glycol indicates the number-average molecular weight of the polyethylene glycol. "Acetylenol E100" is the trade name of a hydrocarbon nonionic surfactant manufactured by Kawaken Fine Chemicals. "Zonyl FS 3100" is the trade name of a fluorine-containing nonionic surfactant manufactured by DuPont. "BYK348" is the trade name of a silicone-containing nonionic surfactant manufactured by BYK-Chemie.

TABLE 2

Compositions and properties of inks

| | Ink | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment dispersion liquid 1 | 40.0 | 40.0 | | | | 40.0 | 40.0 | 40.0 | 40.0 | 40.0 | 40.0 |
| Pigment dispersion liquid 2 | | | 40.0 | | | | | | | | |
| C.I. Acid Red 289 | | | | 4.0 | | | | | | | |
| C.I. Basic Red 2 | | | | | 4.0 | | | | | | |
| Glycerol | 11.0 | 1.0 | 11.0 | 11.0 | 11.0 | 20.0 | 20.0 | 20.0 | 6.0 | 8.0 | |
| Trimethylolpropane | | | | | | | | | 6.0 | | 7.0 |
| Ethylene glycol | | | | | | | | | | | |
| 1,5-Pentanediol | | | | | | | | | | | 8.0 |
| Triethylene glycol | 5.0 | 1.0 | 5.0 | 5.0 | 5.0 | 5.0 | | | | 4.0 | |
| 1,6-Hexanediol | | | | | | | | | | 3.0 | |
| 2-Pyrrolidone | 5.0 | 0.5 | 5.0 | 5.0 | 5.0 | | | | | 7.0 | 6.0 |
| 1,2-Hexanediol | 2.0 | 0.5 | 2.0 | 2.0 | 2.0 | | 5.0 | | | | |
| Triethylene glycol monobutyl ether | | | | | | | | | 3.0 | | |
| Polyethylene glycol 1000 | 2.0 | 22.0 | 2.0 | 2.0 | 2.0 | | | 5.0 | | | |
| Acetylenol E100 | 1.0 | 1.0 | 1.0 | 1.0 | 1.0 | 1.0 | 1.0 | 1.0 | 1.0 | 1.0 | 1.0 |
| Zonyl FS 3100 | | | | | | | | | | | |
| BYK348 | | | | | | | | | | | |
| Ion-exchanged water | 34.0 | 34.0 | 34.0 | 70.0 | 70.0 | 34.0 | 34.0 | 34.0 | 44.0 | 37.0 | 38.0 |
| Water-soluble organic solvent content S (%) | 25.0 | 25.0 | 25.0 | 25.0 | 25.0 | 25.0 | 25.0 | 25.0 | 15.0 | 22.0 | 21.0 |
| Average SP $(cal/cm^3)^{1/2}$ | 14.2 | 10.6 | 14.2 | 14.2 | 14.2 | 15.8 | 15.5 | 15.1 | 15.0 | 14.3 | 14.3 |
| Average dielectric constant | 30.3 | 7.5 | 30.3 | 30.3 | 30.3 | 38.4 | 36.8 | 34.8 | 32.4 | 29.4 | 29.5 |
| Coloring material content C (%) | 4.0 | 4.0 | 4.0 | 4.0 | 4.0 | 4.0 | 4.0 | 4.0 | 4.0 | 4.0 | 4.0 |
| S/C | 6.3 | 6.3 | 6.3 | 6.3 | 6.3 | 6.3 | 6.3 | 6.3 | 3.8 | 5.5 | 5.3 |

| | Ink | | | | | | | | | | |
|---|---|---|---|---|---|---|---|---|---|---|---|
| | 12 | 13 | 14 | 15 | 16 | 17 | 18 | 19 | 20 | 21 | 22 |
| Pigment dispersion liquid 1 | 40.0 | 40.0 | 40.0 | 40.0 | 40.0 | 40.0 | 1.0 | 40.0 | 40.0 | 40.0 | 40.0 |
| Pigment dispersion liquid 2 | | | | | | | | | | | |
| C.I. Acid Red 289 | | | | | | | | | | | |
| C.I. Basic Red 2 | | | | | | | | | | | |
| Glycerol | 6.0 | 6.0 | 8.0 | 8.5 | 1.6 | 1.7 | 9.0 | 11.0 | 11.0 | 11.0 | 0.5 |
| Trimethylolpropane | | | | | | | | | | | |
| Ethylene glycol | | | | | | | | | | | |
| 1,5-Pentanediol | | | | | | | | | | | |
| Triethylene glycol | 5.0 | 5.5 | 1.0 | 1.0 | 0.8 | 0.8 | 4.0 | 5.0 | 5.0 | 5.0 | 0.5 |
| 1,6-Hexanediol | | | 10.0 | 10.0 | | | | | | | |
| 2-Pyrrolidone | 5.0 | 5.5 | 1.0 | 0.5 | 0.7 | 0.8 | 4.0 | 5.0 | 5.0 | 5.0 | 0.5 |
| 1,2-Hexanediol | 3.0 | 3.0 | 1.0 | 1.0 | 0.3 | 0.4 | 1.5 | 2.0 | 2.0 | 2.0 | 0.5 |
| Triethylene glycol monobutyl ether | | | | | | | | | | | |
| Polyethylene glycol 1000 | 6.0 | 5.0 | 4.0 | 4.0 | 0.3 | 0.3 | 1.5 | 2.0 | 2.0 | 2.0 | 23.0 |
| Acetylenol E100 | 1.0 | 1.0 | 1.0 | 1.0 | 1.0 | 1.0 | 1.0 | | | | 1.0 |
| Zonyl FS 3100 | | | | | | | | | 1.0 | | |
| BYK348 | | | | | | | | | | 1.0 | |
| Ion-exchanged water | 34.0 | 34.0 | 34.0 | 34.0 | 55.3 | 55.0 | 78.0 | 35.0 | 34.0 | 34.0 | 34.0 |
| Water-soluble organic solvent content S (%) | 25.0 | 25.0 | 25.0 | 25.0 | 3.7 | 4.0 | 20.0 | 25.0 | 25.0 | 25.0 | 25.0 |
| Average SP $(cal/cm^3)^{1/2}$ | 13.0 | 13.1 | 13.8 | 13.9 | 14.2 | 14.1 | 14.3 | 14.2 | 14.2 | 14.2 | 10.4 |
| Average dielectric constant | 23.2 | 24.0 | 19.7 | 20.0 | 30.1 | 29.9 | 30.6 | 30.3 | 30.3 | 30.3 | 6.4 |
| Coloring material content C (%) | 4.0 | 4.0 | 4.0 | 4.0 | 4.0 | 4.0 | 0.1 | 4.0 | 4.0 | 4.0 | 4.0 |
| S/C | 6.3 | 6.3 | 6.3 | 6.3 | 0.9 | 1.0 | 200.0 | 6.3 | 6.3 | 6.3 | 6.3 |

<Evaluation>

In accordance with a combination of an ink tank main body and an ink shown in left columns in Table 3, the ink tank main body was filled with the ink to prepare an ink tank. The amount of the ink loaded was 95% of the maximum ink capacity of the ink tank main body. The prepared ink tank was stored in an environment at −10° C. for 3 days. The ink tank was next allowed to stand at 25° C. for 24 hours. The ink tank was then installed in an ink jet recording apparatus having the principal part shown in FIG. 7, and the ink was continuously ejected at a temperature condition of 25° C. until the ink was not supplied. The remaining amount of the ink when the ink supply was stopped was determined. The "ink consumption rate (%)" was calculated in accordance with Expression (2), and the ink use-up property was evaluated on the basis of the following criteria. The results are shown in Table 3.

Ink consumption rate (%)={(X−Y)/X}×100    (2)

X: The amount of an ink charged in an ink tank main body (g)
Y: The remaining amount of an ink when the ink supply was stopped (g)
[Criteria]
A: The ink consumption rate was 90% or more.
B: The ink consumption rate was 80% or more to less than 90%.
C: The ink consumption rate was 70% or more to less than 80%.
D: The ink consumption rate was less than 70%.

TABLE 3

Evaluation conditions and evaluation results

| | Ink tank | | |
|---|---|---|---|
| | Ink tank main body | Ink | Evaluation result (ink use-up property) |
| Example | 1 | 1 | A |
| | 2 | 1 | A |
| | 3 | 2 | B |
| | 4 | 3 | A |
| | 5 | 4 | A |
| | 6 | 5 | A |
| | 7 | 6 | A |
| | 8 | 7 | A |
| | 9 | 8 | A |
| | 10 | 9 | A |
| | 11 | 10 | A |
| | 12 | 11 | A |
| | 13 | 12 | B |
| | 14 | 13 | A |
| | 15 | 14 | B |
| | 16 | 15 | A |
| | 17 | 16 | B |
| | 18 | 17 | A |
| | 19 | 18 | A |
| | 20 | 19 | B |
| | 21 | 20 | A |
| | 22 | 21 | A |
| | 23 | 3 | 1 | B |
| | 24 | 4 | 1 | A |
| | 25 | 5 | 1 | A |
| | 26 | 6 | 1 | B |
| Comparative Example | 1 | 1 | 22 | C |
| Reference Example | 1 | 7 | 22 | A |
| | 2 | 8 | 22 | A |
| | 3 | 9 | 22 | A |
| | 4 | 10 | 22 | A |

The ink tank of Comparative Example 1 caused obstruction at a plurality of positions in the ink storage bag at the time of recording completion, and a sufficient amount of the ink was failed to be supplied. Each ink tank of Reference Examples 1 and 2 had a pressure regulatory mechanism, and thus the ink was used up. Each ink tank of Reference Examples 3 and 4 had a shrinkage control mechanism, and thus the ink was used up.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-200729, filed Oct. 17, 2017, Japanese Patent Application No. 2017-200730, filed Oct. 17, 2017, and Japanese Patent Application No. 2018-179946, filed Sep. 26, 2018, which are hereby incorporated by reference herein in their entirety.

What is claimed is:

1. An ink tank for an ink jet recording apparatus, the ink tank comprising:
an ink storage bag storing an ink therein, the ink storage bag having a side wall portion and being configured to cause the side wall portion to shrink as the ink flows out, wherein
the side wall portion is not configured to shrink into a predetermined shape,
the ink tank has no mechanism for adjusting a pressure in the ink storage bag,
the ink storage bag is made from a resin,
the ink is an aqueous ink containing a coloring material and a water-soluble organic solvent, and
a difference between an average SP of the water-soluble organic solvent and an SP of the resin constituting the ink storage bag is 2.0 $(cal/cm^3)^{1/2}$ or more.

2. The ink tank according to claim 1, wherein the difference between the average SP of the water-soluble organic solvent and the SP of the resin constituting the ink storage bag is 4.5 $(cal/cm^3)^{1/2}$ or more.

3. The ink tank according to claim 1, wherein the water-soluble organic solvent has an average dielectric constant of 20.0 or more.

4. The ink tank according to claim 3, wherein the water-soluble organic solvent has an average dielectric constant of 50.0 or less.

5. The ink tank according to claim 1, wherein, in the ink, a mass ratio of a content (% by mass) of the water-soluble organic solvent relative to a content (% by mass) of the coloring material is 1.0 time or more.

6. The ink tank according to claim 5, wherein the mass ratio of the content (% by mass) of the water-soluble organic solvent relative to the content (% by mass) of the coloring material is 200.0 times or less.

7. The ink tank according to claim 1, wherein the ink further contains a surfactant.

8. The ink tank according to claim 1, wherein the ink storage bag has an elastic modulus of 500 $N/mm^2$ or less.

9. The ink tank according to claim 8, wherein the ink storage bag has an elastic modulus of 50 $N/mm^2$ or more.

10. The ink tank according to claim 1, wherein the ink storage bag has a cylindrical shape.

11. An ink jet recording apparatus comprising:
the ink tank according to claim 1; and
a recording head configured to eject an ink supplied from the ink tank by an ink jet method.

12. The ink tank according to claim 1, wherein the side wall portion of the ink bag shrinks irregularly as the ink flows out.

13. The ink tank according to claim 1, wherein the side wall portion of the ink bag shrinks isotropically as the ink flows out.

14. The ink tank according to claim 1, wherein the resin comprises a polyolefin resin.

15. The ink tank according to claim 1, wherein the resin comprises a polyethylene resin.

16. The ink tank according to claim 1, wherein the resin comprises a filler.

17. The ink tank according to claim 1, wherein the difference between the average SP of the water-soluble organic solvent and the SP of the resin constituting the ink storage bag is 10.0 $(cal/cm^3)^{1/2}$ or less.

18. The ink tank according to claim 1, wherein the ink storage bag is made from a single layer of the polyolefin resin.

19. The ink tank according to claim 1, wherein an ink capacity of the ink storage bag is 100 to 1,000 mL.

20. The ink tank according to claim 1, wherein the ink storage bag is produced by blow molding.

* * * * *